(12) United States Patent
Kamizawa

(10) Patent No.: US 6,989,639 B2
(45) Date of Patent: Jan. 24, 2006

(54) TELEVISION IMAGE RECEIVING APPARATUS AND CRT DISPLAY APPARATUS

(75) Inventor: Koji Kamizawa, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/870,167

(22) Filed: Jun. 17, 2004

(65) Prior Publication Data

US 2004/0257009 A1   Dec. 23, 2004

(30) Foreign Application Priority Data

Jun. 19, 2003   (JP)   .......................... P2003-174493

(51) Int. Cl.
G09G 1/04   (2006.01)

(52) U.S. Cl. .................... 315/382.1; 315/411; 348/380

(58) Field of Classification Search ............. 315/382.1, 315/411, 399, 379, 387; 348/725, 380, 729–733, 348/805; G09G 1/04; H01J 29/70; H04N 5/68
See application file for complete search history.

(56) References Cited

U.S. PATENT DOCUMENTS

| 4,121,252 | A | * | 10/1978 | Saiki et al. | ................. | 348/380 |
| 5,177,413 | A | * | 1/1993 | Wilber | ........................ | 315/383 |
| 6,011,593 | A | * | 1/2000 | Onozawa et al. | ........... | 348/556 |
| 6,108,045 | A | * | 8/2000 | Onozawa et al. | ........... | 348/556 |

FOREIGN PATENT DOCUMENTS

| JP | 9-247488 | 9/1997 |
| JP | 10-65931 | 3/1998 |

* cited by examiner

*Primary Examiner*—Thuy Vinh Tran
(74) *Attorney, Agent, or Firm*—Osha Liang LLP

(57) ABSTRACT

In a configuration equipped with an anode current detecting resistor connected between a ground side terminal of secondary coils wound around a flyback transformer and generating a high voltage for an anode of a CRT, it is equipped with declination detecting device which detects declination of a voltage of the ground side terminal, and control device which stops an operation of a horizontal output transistor, after a state is shifted from a power OFF state to a power ON state, when the declination detecting device 5 does not detect declination of a voltage of the ground side terminal in case that a predetermined period has passed.

5 Claims, 3 Drawing Sheets

TELEVISION IMAGE RECEIVING APPARATUS AND CRT DISPLAY APPARATUS

BACKGROUND OF THE INVENTION

1. Field of the Invention

The invention relates to a television image receiving apparatus and a CRT (Cathode-Ray tube)display apparatus which are equipped with an anode current detecting resistor connected between a ground side terminal of a secondary coil wound around a flyback transformer and generating a high voltage for an anode of a CRT and a power route with a predetermined voltage, and more specifically, relates to a television image receiving apparatus and a CRT display apparatus, which stop generation of a high voltage when a route of the high voltage has not yet connected.

2. Description of the Related Art

In production lines of television image receiving apparatuses, in the vicinity of an end of a process of the line, a commercial power source is supplied to a set to which, attachment of a substrate and a CRT etc., on which a flyback transformer is mounted, is completed so as to have it operated, and various inspections are to be carried out. On one hand, at the side of the set, when supply of the commercial power source is started, a high voltage generation circuit carries out such an operation that it generates a high voltage for an anode, and outputs the same (regarded as first related art).

Such related art that, in case that a connector of a deflection coil has not yet connected, an operation of a horizontal deflection circuit and an operation of a high voltage generation circuit are stopped, has been proposed (regarded as second related art). That is, by this technology, in order to detect a connection trouble between an output terminal of the horizontal deflection circuit and a deflection yoke, disposed is an abnormal voltage detection part. And, when the abnormal voltage detection part detected the connection trouble, supply of power to a horizontal oscillation part is stopped, and thereby, an operation of the horizontal deflection circuit and an operation of the high voltage generation circuit are made to be stopped (see paragraph [0027] in JP-A-9-247488). Or, when the abnormal voltage detection part detected the connection trouble, a signal from the abnormal voltage detection part is guided between the horizontal oscillation part and a horizontal drive circuit, and thereby, an operation of the horizontal deflection circuit and an operation of the high voltage generation circuit are made to be stopped (See paragraph [0028] in JP-A-9-247488). On this account, in case that a connector for a deflection coil is unconnected, an operation of the horizontal deflection circuit and an operation of the high voltage generation circuit are to be stopped (e.g., see, JP-A-9-247488).

A related art technology as shown below has been proposed (regarded as third related art). That is, by this technology, when discharge is generated at a high voltage portion, a noise is superposed on a horizontal oscillation pulse, and therefore, this noise is cut out by use of a zener diode. Also, a noise component which is cut out is rectified by a diode, and stored up in a capacitor. And, it is designed in such a manner that, when a voltage between terminals of the capacitor reached to a certain level, it is judged as a discharge. In addition, in this judgment, distinguished are such a fact that the discharge is continuing more than a predetermined amount of time, and such a fact that it is simply an instantaneous noise. And, in case of a noise which continues for more than a predetermined amount of time, it is judged as a discharge to stop supply of power (e.g., see JP-A-10-65931).

However, in the first related art, even in case that an anode cap is not connected to an anode of a CRT, or an anode ground is not connected to ground, the high voltage generation circuit generates a high voltage. On this account, in case that the anode cap and the anode ground have not yet been connected, there is such a case that a discharge occurs between them and a unexpected spot, so that there occurs such a risk that a set is broken down. Furthermore, there is such a risk that an inspector gets an electric shock, which is very dangerous. And, the such like situation also occurs at the time of repairing a substrate, in the same manner. On this account, in case that a route of a high voltage is unconnected, such a configuration that an operation of a high voltage generation circuit is made to be stopped by detecting to be unconnected has been desired.

The second related art is configured in such a manner that, in case that a connector of a deflection coil becomes unconnected, an operation of a horizontal circuit and an operation of a high voltage generation circuit are stopped. However, an operation in case that a route of a high voltage for an anode became unconnected is not described at all. On this account, in case of an objective which is desired in the first related art, i.e., in case of stopping an operation of a high voltage generation circuit when a route of a high voltage becomes unconnected, it is a technology which is difficult to be applied.

The third related art is of such a configuration for detecting a discharge of a high voltage. On this account, in case of an objective which is desired in the first related art, i.e., in case of stopping an operation of a high voltage generation circuit when a route of a high voltage becomes unconnected, it is a technology which is difficult to be applied.

SUMMARY OF THE INVENTION

The invention has been proposed to solve the above-described problem. It is an object of the invention to provide such a CRT display apparatus that, even when predetermined time has passed, when there occurs no declination of a voltage of a ground side terminal of a secondary coil for a high voltage, of a flyback transformer, it is regarded that a route of a high voltage for an anode is unconnected, and an operation of a horizontal output transistor is stopped, and thereby, it is possible to prevent electric shock and generation of a discharge which arise from such a fact that the route of the high voltage for anode is unconnected, and also, it is possible to simplify a configuration of device for detecting declination of a voltage of the above-described ground side terminal, and also, when the route of the high voltage for anode is unconnected, it is possible to stop generation of a high voltage at fast timing, and also, it is possible to carry out an warning informing that the route of the high voltage for anode is unconnected.

It is an another object of the invention to provide such a CRT display apparatus that, when the route of the high voltage for anode is unconnected, focusing on such a fact that declination of a voltage of the ground side terminal of the secondary coil for high voltage of the flyback transformer does not occur also when it becomes time at which it is assumed that a tube surface of the CRT is brighten up, when declination of a voltage of the above-described ground side terminal does not occur even when predetermined time has passed, it is regarded that the route of the high voltage for anode is unconnected, and an operation of the horizontal output transistor is stopped, and thereby, it is possible to prevent electric shock and generation of a discharge which arise from such a fact that the route of the high voltage for anode is unconnected.

In addition to the above-described objectives, it is to provide a CRT display apparatus which can simplify a configuration of device for detecting declination of a voltage of the above-described ground side terminal.

In addition to the above-described objectives, it is to provide a CRT display apparatus which can stop generation of a high voltage at fast timing, when the route of the high voltage for anode is unconnected.

In order to solve the above-described problems, a television image receiving apparatus which relates to this invention is applied to a television receiver which is equipped with a display part which is disposed on a front panel of an apparatus main body, and on which, information such as ON and OFF of power is displayed, and an anode current detecting resistor which is connected between a ground side terminal of a secondary coil wound around a flyback transformer and generating a high voltage for an anode of a CRT and a power route with a predetermined voltage. And, it is equipped with declination detecting device which detects declination of a voltage of the ground side terminal, and control device which stops an operation of a horizontal output transistor, and carries out warning display for showing an abnormality of a connection of a route of a high voltage by using the display part, when the declination detecting device does not detect declination of a voltage of the ground side terminal, even when time, at which it is assumed that a tube surface of the CRT is brighten up, has passed, after a state is shifted from a power OFF state to a power ON state, and the declination detecting device is equipped with a capacitor, one terminal of which is connected to the ground side terminal, and a pull-up resistor which is connected between the other terminal of the capacitor and a logic circuit positive power source, and it is configured in such a manner that a detection result is outputted from the other terminal of the capacitor.

That is, in case that the route of the high voltage for anode is normally connected, when a state is shifted from a power ON state to a power OFF state, after several seconds, a tube surface of a CRT is shifted from a dark state to a bright state. And, when the tube surface of the CRT is shifted from the dark state to the bright state, there occurs declination of a voltage of the ground side terminal. On one hand, in case that the route of the high voltage for anode is unconnected, even when it becomes time at which it is assumed that the tube surface of the CRT is brightened up, the tube surface of the CRT is not shifted from the dark state to the bright state. On this account, there occurs no declination of a voltage of the ground side terminal. That is, as a detection result of the declination detecting device, it shows whether a connection of the route of the high voltage for anode is normal or not. And, when the connection of the route of the high voltage for anode is not normal, generation of the high voltage is stopped. Also, it is possible to configure the declination detecting device by use of 2 elements. Also, a voltage of the ground side terminal is declined until time T at which it is assumed that the tube surface of the CRT is brightened up. Therefore, after timing, at which it becomes possible to detect whether a voltage of the ground side terminal is declined or not, has passed, immediately, carried out is a process which corresponded to the detection result. Also, in case that the route of the high voltage for anode is unconnected, an warning is displayed on the display part.

A CRT display apparatus which relates to this invention is applied to a CRT display apparatus which is equipped with an anode current detecting resistor which is connected between a ground side terminal of a secondary coil wound around a flyback transformer and generating a high voltage for an anode of a CRT and a power route with a predetermined voltage. And it is equipped with declination detecting device which detects declination of a voltage of the ground side terminal, and control device which stops an operation of a horizontal output transistor, when the declination detecting device does not detect declination of a voltage of the ground side terminal, even when predetermined time has passed, after a state is shifted from a power OFF state to a power ON state.

That is, in case that the route of the high voltage for anode is normally connected, when a state is shifted from a power ON state to a power OFF state, after several seconds, a tube surface of a CRT is shifted from a dark state to a bright state. And, when the tube surface of the CRT is shifted from the dark state to the bright state, there occurs declination of a voltage of the ground side terminal. On one hand, even in case that the route of the high voltage for anode is not connected normally, even when it becomes time at which it is assumed that the tube surface of the CRT is brightened up, the tube surface of the CRT is not shifted from the dark state to the bright state. On this account, there occurs no declination of a voltage of the ground side terminal. That is, by a detection result of the declination detecting device, it is shown whether a connection of the route of the high voltage for anode is normal or not. And, when the connection of the route of the high voltage for anode is not normal, generation of the high voltage is stopped.

In addition to the above-described configuration, the declination detecting device is equipped with a capacitor, one terminal of which is connected to the ground side terminal, and a pull-up resistor which is connected between the other terminal of said capacitor and a logic circuit positive power source, and is configured in such a manner that a detection result is outputted from the other terminal of the capacitor. That is it is possible to configure the declination detecting device by use of 2 elements.

In addition to the above-described configuration, the predetermined period is a period from time at which a state is shifted from the power OFF state to the power ON state until time at which it is assumed that a tube surface of the CRT is brighten up. Therefore, after timing, at which it becomes possible to detect whether a voltage of the ground side terminal is declined or not, has passed, immediately, carried out is a process which corresponded to the detection result.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Hereinafter, modes for carrying out this invention will be described with reference to drawings.

Figure 1:
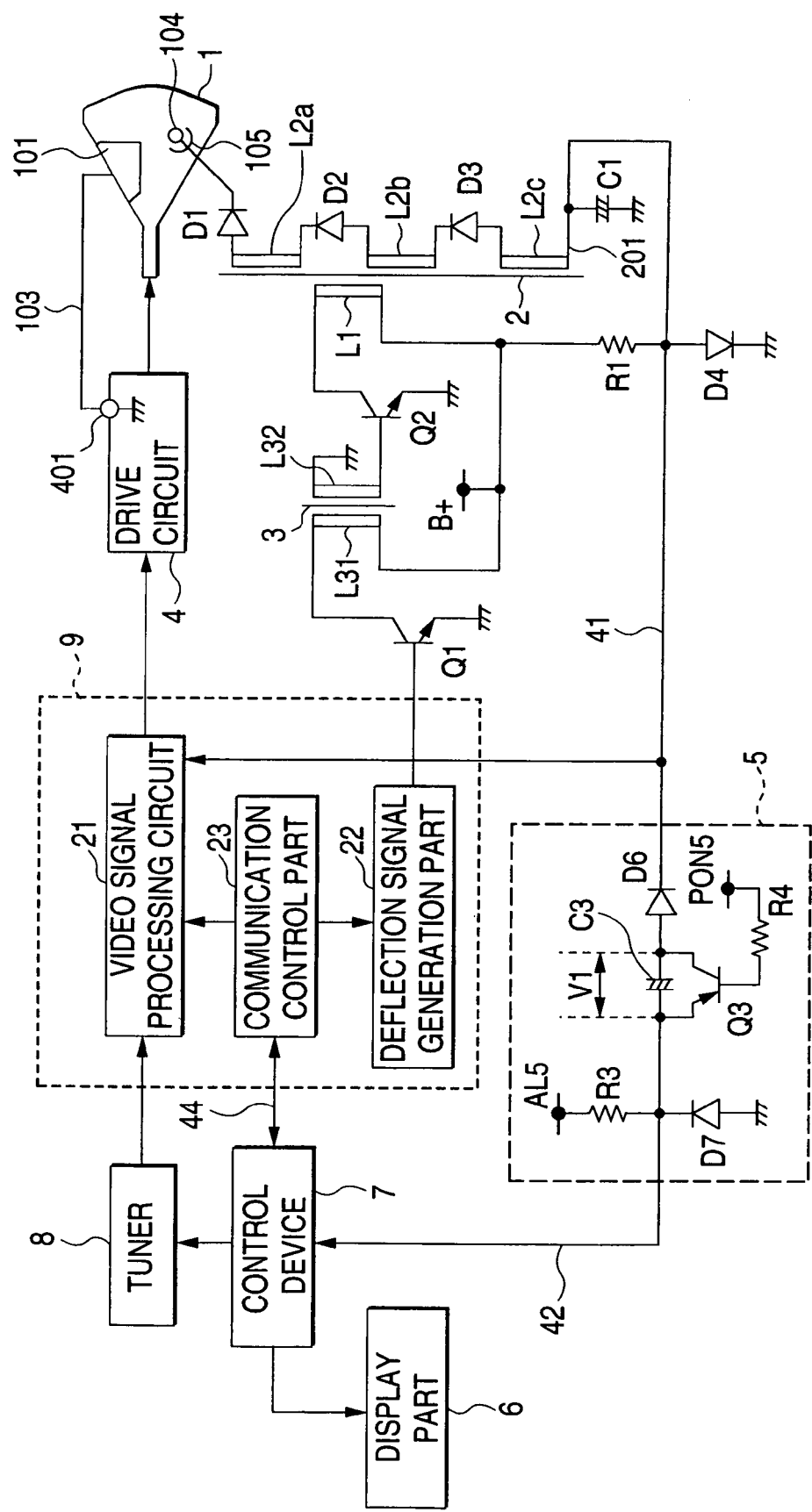
FIG. 1 is a block diagram showing an electric configuration of a television image receiving apparatus which used one embodiment of a CRT display apparatus which relates to this invention.

FIG. 1 is a block diagram showing an electric configuration of a television image receiving apparatus which used one embodiment of a CRT display apparatus which relates to this invention.

In the FIGURE, a video signal processing circuit 21 applies predetermined processing to video signals inputted, to generates 3 primary color chrominance signals. And, the generated 3 primary color chrominance signals are outputted to a drive circuit 4. And, in the above-described predetermined processing, in accordance with an instruction of control device 7, which is given through a communication control part 23, luminance, hue etc. in the video signal is set up to luminance and hue which are instructed. Also, on the basis of an ACL signal (signal which shows a voltage of a ground side terminal 201 (signal which shows an anode current of a CRT 1))41, a contrast of video pictures which are shown on the CRT 1 is restricted. In addition, the ACL signal is an abbreviated expression of an Automatic Contrast Limitter signal.

A drive circuit 4 is designed to be a circuit which is formed on an auxiliary substrate to be attached to a rear part of the CRT 1, and is equipped with a drive transistor etc. for amplifying each of the primary color chrominance signals. And, it amplifies a color signal which is outputted from the video signal processing circuit 21, and drives a cathode of the CRT 1. Also, disposed is a terminal 401 for connecting the other end of an anode ground line 103, one end of which is connected to an external conductive film 101 of the CRT 1. In addition, this terminal 401 is connected to a ground level in the auxiliary substrate.

A deflection signal generation part 22 generates a drive signal (pre-drive signal), on the basis of a horizontal synchronizing signal which is separated from a video signal, and an AFC signal (not shown in the FIGURE). And, the generated pre-drive signal is outputted to a base of a horizontal drive transistor Q1 (hereinafter, simply referred to as transistor Q1).

The transistor Q1 switches a current flowing through a drive transformer 3 in accordance with the pre-drive signal which is outputted from the deflection signal generation part 22. On this account, the pre-drive signal is guided to the base of the transistor Q1. Also, a collector is connected to one terminal of a primary coil L31 of the drive transformer 3, and an emitter is grounded. And, the other terminal of the primary coil L31 is connected to a positive power source B+ such as 110V.

A horizontal output transistor Q2 (hereinafter, simply referred-to as transistor Q2) drives a deflection coil (not shown in the FIGURE) which is disposed on the CRT 1, by carrying out a switching operation in accordance with an output of the drive transformer 3. Also, it drives a flyback transformer 2. On this account, a base of the-transistor Q2 is connected to one terminal of a secondary coil L32 of the drive transformer 3. Also, the other terminal of the secondary coil L32 and an emitter of the transistor Q2 are grounded. And, a collector is connected to one terminal of a primary coil L1 of the flyback transformer 2. Also, the other terminal of the primary coil L1 of the flyback transformer 2 is connected to a positive power source B+.

Around the flyback transformer 2, wound are secondary coils L2a~L2c which are divided into a plurality of pieces, in order to generate a high voltage for an anode 104 of the CRT 1 (hereinafter, simply referred to as high voltage). And, one terminal of the secondary coil L2a is connected to an anode cap 105 through a diode D1. Also, between the secondary coils L2a and L2b, and between the secondary coils L2b and L2c, connected are rectifying diodes D2, D3. Also, between the ground side terminal 201 of the secondary coil L2c, and the positive power source B+ which is a power supply route of a predetermined voltage, connected is a resistor R1 for detecting an anode current (hereinafter, simply referred to as resistor R1).

Between the ground side terminal 201 and the ground level, connected is a capacitor C1 for short-circuiting on an alternating current basis. Also, between the ground side terminal 201 and the ground level, connected is a diode D2, in such a direction that a current flows from the side of the ground side terminal 201 to the side of the ground level, in order to prevent a voltage of the ground side terminal 201 from exceeding a voltage in the vicinity of 0V.

The communication control part 23 is connected interactively to the control device 7 through 2 communication lines (BUSS communication lines) 44, and the video signal processing circuit 21 and the deflection signal generation part 22 are set up to an operating state which is instructed by the control device 7. That is, when the control device 7 instructs an operation of the transistor Q2, it has a signal for driving the base of the transistor Q1 outputted from the deflection signal generation part 22, and when the control device 7 instructs a stop of an operation of the transistor Q2, it stops an output of the pre-drive signal for driving the base of the transistor Q1. Also, it controls the video signal processing circuit 21, in such a manner that luminance, hue etc. of the video signal in the video signal processing circuit 21 become values which are instructed by the control device 7.

The declination detecting device 5 is designed to be a block which detects declination of a voltage of the ground side terminal 201 (voltage of the ACL signal 41), and when it detected that it is declined, it sends out a L level to the control device 7 through a route 42. On this account, it is equipped with a PNP transistor Q3 (hereinafter, simply referred to as transistor Q3), 2 diodes D6, D7, 2 resistors R3, R4, and a capacitor C3, and designed to configure a differentiation circuit which detects declination of a voltage of the ground side terminal 201.

In detail, a cathode of the diode D6 is connected to the ground side terminal 201. Also, one terminal of the capacitor C3 is connected to an anode of the diode D6, and the other terminal is guided to the control device 7, as an output point of a detection result of declination of a voltage of the ground side terminal 201, through the route 42. Also, the other terminal of the capacitor C3 is connected to a positive power source (logic circuit positive power source) AL5 which is maintained to be 5V even at the time of power OFF, through a pull-up resistor R3.

In order to prevent a voltage span of the other terminal of the capacitor C3 from becoming negative, a cathode of the diode D4, an anode of which is grounded, is connected to the other terminal of the capacitor C3. Also, to one terminal of the capacitor C3, connected is a collector of the transistor Q3, and to the other terminal of the capacitor C3, connected is an emitter of the transistor Q3. And, to a base of the transistor Q3, guided is a positive power source PON5, which becomes 0V at the time of power OFF, and 5V at the time of power ON, through the resistor R4.

Figure 2:
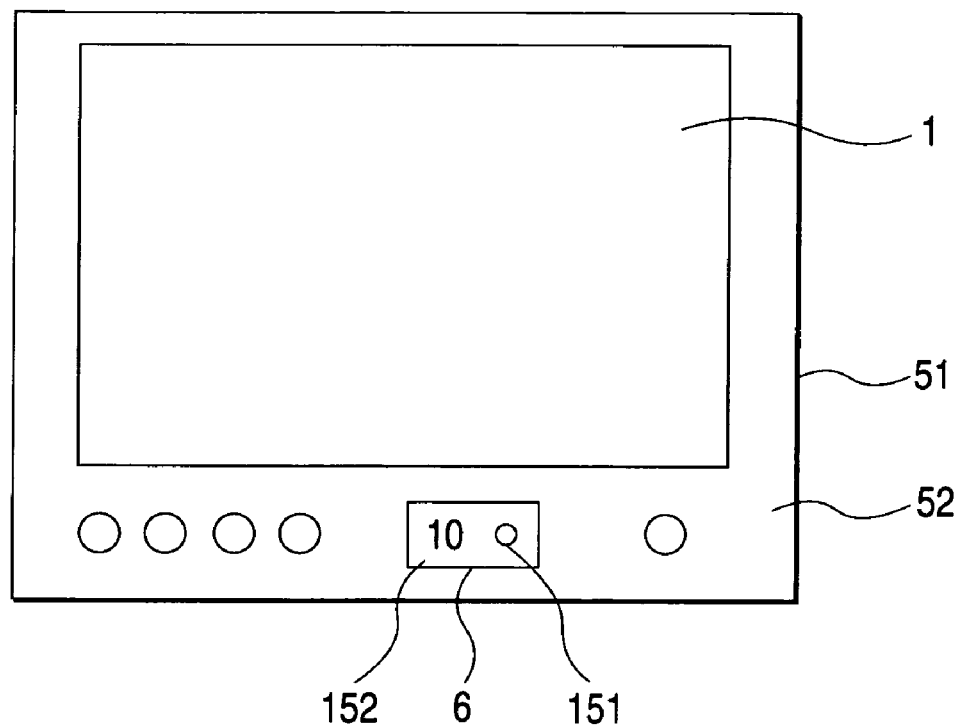
FIG. 2 is an explanation view showing an appearance of a front panel of an apparatus main body.

A tuner 8 receives commercial broadcasting of a channel which is instructed by the control device 7. And, a video signal, which is obtained by having received, is outputted to the video signal processing circuit 21. The display part 6 is, as shown in FIG. 2, an indicator which is disposed on a front panel 52 of an apparatus main body 51, and ON/OFF of power is displayed by a LED 151. Also, it is configured in such a manner, by a numerical character indicator 152, time is displayed at the time of power OFF, and a receiving channel number is displayed at the time of power ON.

The control device 7 is configured as a major part of a microcomputer, and carries out control of major operations as a television image receiving apparatus (control of operations as an apparatus). On this account, it controls a channel which is received by the tuner 8. Also, it sets up various operating states of the video signal processing circuit 21, through the communication control part 23. Also, when a state is shifted from the, power OFF state to the power ON state, it checks whether a detection result which shows declination of a voltage (L level) is sent out from the declination detecting device 5 or not. And, when the L level which shows the declination of the voltage is not sent out even in case that it became time at which it is assumed that a tube surface of the CRT 1 is brightened up, it is regarded that a route of a high voltage is unconnected, it stops sending-out of the pre-drive signal from the deflection signal generation part 22 to the transistor Q1, through the communication control part 23, and stops an operation of the horizontal output transistor Q2.

In addition, a block 9, which comprises the video signal processing circuit 21, the deflection signal generation circuit 22, and the communication control part 23, is made to be a video/chroma IC.

Figure 3:
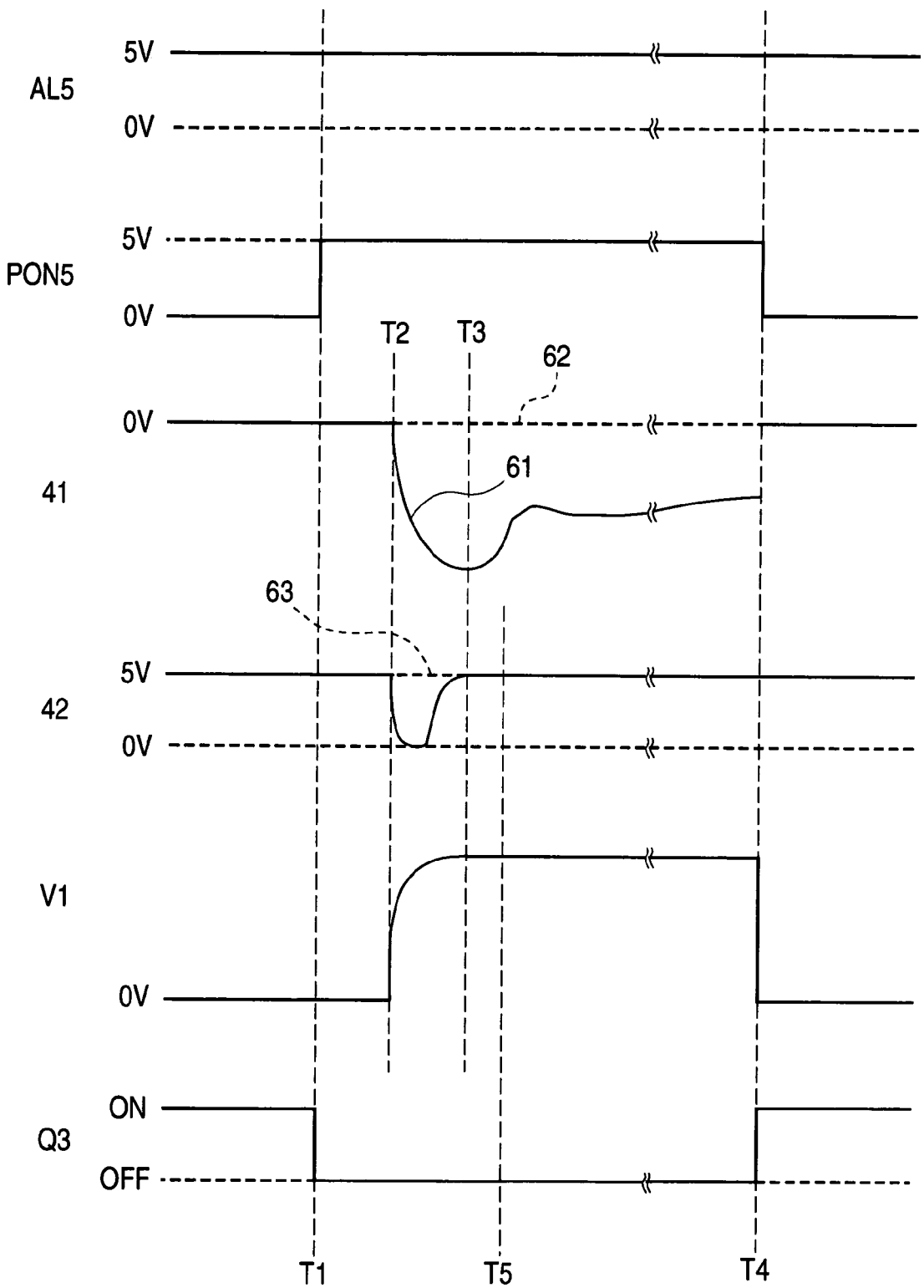
FIG. 3 is an explanation view showing a level change of a major point of the embodiment.

FIG. 3 is an explanation view which shows a level change of a major point of the embodiment. An operation of the embodiment will be described, over referring to the same FIGURE according to need.

Now, it is assumed that the anode cap 105 is connected to the anode 104 of the CRT 1 and the anode ground line 103 is connected to the terminal 401 of the drive circuit 4. That is, it is assumed that the route of the high voltage is formed normally. Also, since it is in a power OFF state, it is assumed that the positive power source PON5 has become 0V. In case that the positive power source PON5 becomes 0V, a base current flows in the transistor Q3, through the resistors R3 and R4, and the transistor Q3 is turned to an ON state. Therefore, the capacitor C3 is in a discharged state.

In this state, when an instruction of power ON is inputted, the control device 7 starts supply of operating power which is required by each part, by controlling a not-shown power supply part (time T1). On this account, a voltage of the positive power source PON5 is changed from 0V to 5V. As a result of that, in the transistor Q3, an electric potential of the emitter and a base electric potential equal out, and therefore, the transistor Q3 is shifted from an ON state to an OFF state. Also, the control device 7 has the pre-drive signal outputted from the deflection signal generation part 22, and has the transistors Q1, Q2 operated. On this account, the flyback transformer 2 is driven by the transistor Q2, and a high voltage is to be applied to the anode 104.

In accordance with such a fact that a heater of the CRT 1 is warmed up and a tube surface is brightened up, an anode current starts flowing (time T2). When the anode current starts flowing, a voltage of the route 41 (voltage of the ground side terminal 201) is rapidly declined from 0V to a negative side, due to a voltage drop which occurred on the resistor R1 (shown by 61). Due to this rapid declination of a voltage, a current flows from the positive power source AL5 to the side of the route 41, through the resistor R3, the capacitor C3, and the diode D6 (a value of the resistor R3 is set to a larger value (e.g., 500 k. etc.) than a value of the resistor R1, in order to reduce the influence to a voltage of the route 41, even when a current flows through the capacitor C3). As a result of that, a voltage of the route 42 is decreased up to 0V.

On one hand, a voltage of the route 41 shows rapid declination when a tube surface of the CRT 1 is brightened from a dark state, but after it is brightened up, the declination is stopped (time T3). On this account, a current flowing through the capacitor C3 becomes 0 vicinity, when it became the time T3, and therefore, a voltage of the route 42 is returned to 5V. And, after the time T3, brightness of the tube surface of the CRT 1 is controlled by the video signal processing circuit 21, so as to become brightness which is instructed from the control device 7. On this account, on and after the time T3, a voltage of the route 41 simply shows a gradual change. Therefore, a voltage of the route 42 does not almost change from 5V.

That is, a voltage of the route 42 changes from 5V (H level) to the vicinity of 0V (L level) in a period of approximately several 100 msec, in case that a state is shifted from a power OFF state to a power ON state, when several seconds, in which a heater is warmed up, have passed. On this account, the control device 7 monitors a level of the route 43, when it has the power shifted from an OFF state to an ON state. And, when an L level appears on the route 42 in a period until time T5 at which it is assumed that the tube surface of the CRT 1 is brightened up (e.g., 10 seconds), it is regarded that a route of a high voltage is connected normally, an operation of the transistor Q2 is made to be continued. On this account, a high voltage continues to be applied to the anode of the CRT 1, and an image due to a video signal is displayed on the tube surface of the CRT 1.

In case that the above-described state continues, and an instruction of power OFF is inputted, the control device 7 stops supply of operating power to each block, by controlling a power supply part. On this account, a voltage of the positive power source PON5 also changes from 5V to 0V (positive power source AL5 is maintained to 5V). As a result of that, a base current flows through the transistor Q3, and therefore, the transistor Q3 is shifted from an OFF state to an ON state. On one hand, in the capacitor C3, a current flows during a period from the time T2 until the time T3, and therefore, it is charged by this current, and a voltage is generated between terminals (shown by V1 of FIG. 2). However, electric charges, which generates this voltage, are discharged through the transistor Q3 which is shifted to the ON state, when power is turned OFF (time T4). Therefore, when power is turned ON next time, the capacitor C3 has been discharged, and therefore, when there occurs declination of a voltage of the route 41, the above-described operation is to be carried out again.

Hereinafter, a supplementary explanation will be carried out, and in case that it is configured by omitting the transistor Q3, even when power is turned OFF, electric charges of the capacitor C3 are not discharged (or it takes long time for discharging). And, when electric charges are maintained to be charged in the capacitor C3, power is shifted from an OFF state to an ON state, and even when there occurs rapid declination of a voltage of the route 41, a current does not flow through the capacitor C3. Therefore, even when a connection of a route of a high voltage is normal, an L level does not appear on the route 42. That is, it becomes impossible to carry out detection correctly. The transistor Q3 and the resistor R4 are elements for eliminating the above-described disadvantage. In addition, the diode D6 operates so as to prevent electric charges, which are charged in the capacitor C3, from being discharged through the route 41

(an input circuit for the route 41, of the video signal processing circuit 21 is protected from breakdown).

This finishes an operation explanation in case that a connection of a route of a high voltage is normal, and hereinafter, an operation in case that the anode cap 105 is not connected to the anode 104, or the anode ground line 103 is not connected to the terminal 401 will be described.

In case that the anode cap 105 is not connected to the anode 104, or the anode ground line 103 is not connected to the terminal 401, a current route of a high voltage is nor formed. On this account, even when a state is shifted from a power OFF state to a power ON state, and a heater is warmed up (after time T2), there occurs no declination of a voltage of the route 41 (shown by a broken line 62). On this account, a current does not flow through the capacitor C3, and therefore, a level of the route 42 does not change from a H level (shown by a broken line 63).

On this account, the control device 7 judges that failure has occurred on a route of a high voltage, even when 10 seconds have passed (when it becomes time T5 at which it is assumed that a tube surface of the CRT 1 is brightened up) from such time that power is turned ON (time T1), in case that an L level does not appear on the route 42. And, when it carried out this judgment, the control device 7 stops such an operation that the deflection signal generation part 22 outputs the pre-drive signal, through the communication control part 23, and stops an operation of the transistor Q1. On this account, the transistor Q2 also stops an operation for driving the flyback transformer 2. As a result of that, an output of a high voltage from the flyback transformer 2 is stopped. That is, in case that a route of a high voltage is not formed (in case that the anode cap 105 is not connected to the anode 104, or the anode ground line 103 is not connected to the terminal 401), after power is turned ON, and when a short period of time of approximately 10 seconds has passed, an output of a high voltage is stopped.

Also, the control device 7, when it carried out control for stopping an output of a high voltage, displays a warning informing that the anode cap 105 is not connected to the anode 104, or the anode ground line 103 is not connected to the terminal 401, by blinking the LED 151 of the display part 65, which shows power ON.

In addition, this invention is not limited to the above-described embodiments, and described is such a case that a period from such time power is turned ON until time at which it is assumed that the tube surface of the CRT 1 is brightened up is set to 10 seconds, but it is possible to set, as another period, to for example, 8 seconds, or 12 seconds, and so on.

Also, as to the declination detecting device, described is such a case that the differentiation circuit for detecting declination of a voltage of the ground side terminal 201 is used, but as another configuration, for example, it is possible to make such a configuration that it is detected whether a voltage of the ground side terminal 201 is declined or not, on the basis of such a fact that the voltage of the ground side terminal 201 becomes lower than a predetermined negative electric potential.

As described above, this invention is equipped with declination detecting device which detects declination of a voltage of the ground side terminal, and control device which stops an operation of a horizontal output transistor, and carries out warning display for showing an abnormality of a connection of a route of a high voltage by using the display part, when the declination detecting device does not detect declination of a voltage of the ground side terminal, even when time, at which it is assumed that a tube surface of the CRT is brighten up, has passed, after a state is shifted from a power OFF state to a power ON state. Also, the declination detecting device is equipped with a capacitor, one terminal of which is connected to the ground side terminal, and a pull-up resistor which is connected between the other terminal of the capacitor and a logic circuit positive power source, and is configured in such a manner that a detection result is outputted from the other terminal of said capacitor. That is, by a detection result of the declination detecting device, it is shown whether a connection of a route of a high voltage for anode is normal or not, and when the connection of the route of the high voltage for anode is not normal, generation of the high voltage is stopped. Also, the declination detecting device is composed of 2 elements. Also, after timing, at which it becomes possible to detect whether a voltage of the ground side terminal is declined or not, has passed, immediately, carried out is a process which corresponded to the detection result. Also, in case that the route of the high voltage for anode is unconnected, an warning is displayed on the display part. On this account, it is possible to prevent electric shock and generation of a discharge which arise from such a fact that the route of the high voltage for anode is unconnected, and also, it is possible to simplify a configuration of device for detecting declination of a voltage of the ground side terminal, and also, when the route of the high voltage for anode is unconnected, it is possible to stop generation of a high voltage at fast timing, and also, it is possible to carry out an warning informing that the route of the high voltage for anode is unconnected.

The invention is equipped with declination detecting device which detects declination of a voltage of the ground side terminal, and control device which stops an operation of a horizontal output transistor, when the declination detecting device does not detect declination of a voltage of the ground side terminal, even when predetermined time has passed, after a state is shifted from a power OFF state to a power ON state. On this account, by a detection result of the declination detecting device, it is shown whether a connection of a route of a high voltage for anode is normal or not. And, when the connection of the route of the high voltage for anode is not normal, generation of the high voltage is stopped, and therefore, it is possible to prevent electric shock and generation of a discharge which arise from such a fact that the route of the high voltage for anode is unconnected.

Furthermore, the declination detecting device is equipped with a capacitor, one terminal of which is connected to the ground side terminal, and a pull-up resistor which is connected between the other terminal of the capacitor and a logic circuit positive power source, and is configured in such a manner that a detection result is outputted from the other terminal of the capacitor. Therefore, since the declination detecting device is composed of 2 elements, it is possible to simplify a configuration of detecting device of declination of a voltage of the ground side terminal.

Furthermore, the predetermined period is a period from time at which a state is shifted from the power OFF state to the power ON state until time at which it is assumed that a tube surface of the CRT is brighten up. Therefore, after timing, at which it becomes possible to detect whether a voltage of the ground side terminal is declined or not, has passed, immediately, carried out is a process which corresponded to the detection result, and so, it is possible to stop generation of a high voltage at fast timing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A television image receiving apparatus comprising:
a main body of the television image receiving apparatus including a front panel;
a display part disposed on the front panel of the main body, and on which information such as ON and OFF of power is displayed;
a flyback transformer;
a secondary coil generating a high voltage for an anode of a CRT and wound around the flyback transformer, and the secondary coil having a ground side terminal;
an anode current detecting resistor connected between the ground side terminal of the secondary coil and a power route with a predetermined voltage;
a declination detecting means detecting declination of a voltage of the ground side terminal; and
a control means stopping an operation of a horizontal output transistor and warning display for showing an abnormality of a connection of a route of the high voltage by using the display part, when the declination detecting means does not detect the declination of the voltage of the ground side terminal, even when time, at which it is assumed that a tube surface of the CRT is brighten up, has passed, after a state is shifted from a power OFF state to a power ON state, wherein
the declination detecting means includes a capacitor, one terminal of which is connected to the ground side terminal, and a pull-up resistor connected between the other terminal of the capacitor and a logic circuit positive power source, and
a detection result is outputted from the other terminal of the capacitor.

2. A CRT display apparatus comprising:
a flyback transformer;
a secondary coil generating a high voltage for an anode of a CRT and wound around the flyback transformer, and the secondary coil having a ground side terminal;
an anode current detecting resistor connected between the ground side terminal of the secondary coil and a power route with a predetermined voltage;
declination detecting means detecting declination of a voltage of the ground side terminal; and
control means stopping an operation of a horizontal output transistor when the declination detecting means does not detect the declination of the voltage of the ground side terminal, even when a predetermined time has passed, after a state is shifted from a power OFF state to a power ON state.

3. The CRT display apparatus according to claim 2, wherein
the declination detecting means includes a capacitor, one terminal of which is connected to the ground side terminal, and a pull-up resistor connected between the other terminal of the capacitor and a logic circuit positive power source, and
a detection result is outputted from the other terminal of the capacitor.

4. The CRT display apparatus according to claim 2, wherein
the predetermined time is a period from time at which a state of the CRT display apparatus is shifted from the power OFF state to the power ON state until time at which it is assumed that a tube surface of the CRT is brighten up.

5. A television image receiving apparatus comprising:
a main body of the television image receiving apparatus including a front panel;
a display part disposed on the front panel of the main body, and on which information such as ON and OFF of power is displayed;
a flyback transformer;
a secondary coil generating a high voltage for an anode of a CRT and wound around the flyback transformer, and the secondary coil having a ground side terminal;
an anode current detecting resistor connected between the ground side terminal of the secondary coil and a power route with a predetermined voltage;
a declination detecting device detecting declination of a voltage of the ground side terminal; and
a control device stopping an operation of a horizontal output transistor and warning display for showing an abnormality of a connection of a route of the high voltage by using the display part, when the declination detecting device does not detect the declination of the voltage of the ground side terminal, even when time, at which it is assumed that a tube surface of the CRT is brighten up, has passed, after a state is shifted from a power OFF state to a power ON state, wherein
the declination detecting device includes a capacitor, one terminal of which is connected to the ground side terminal, and a pull-up resistor connected between the other terminal of the capacitor and a logic circuit positive power source, and
a detection result is outputted from the other terminal of the capacitor.

* * * * *